(12) United States Patent
Wang et al.

(10) Patent No.: US 7,508,997 B2
(45) Date of Patent: Mar. 24, 2009

(54) METHOD AND APPARATUS FOR VIDEO IMAGE INTERPOLATION WITH EDGE SHARPENING

(75) Inventors: Xianglin Wang, Santa Ana, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 606 days.

(21) Appl. No.: 10/840,493

(22) Filed: May 6, 2004

(65) Prior Publication Data

US 2005/0249437 A1    Nov. 10, 2005

(51) Int. Cl.
*G06K 9/32*    (2006.01)

(52) U.S. Cl. .................................. 382/300
(58) Field of Classification Search ................. 382/300
See application file for complete search history.

(56) References Cited

U.S. PATENT DOCUMENTS

| | | | |
|---|---|---|---|
| 4,729,098 A * | 3/1988 | Cline et al. | 345/421 |
| 5,054,100 A | 10/1991 | Tai | |
| 7,130,483 B2 * | 10/2006 | Kim | 382/266 |
| 2002/0067862 A1 * | 6/2002 | Kim | 382/266 |
| 2003/0185463 A1 * | 10/2003 | Wredenhagen et al. | 382/300 |
| 2004/0091174 A1 | 5/2004 | Wang et al. | |

* cited by examiner

*Primary Examiner*—Brian P Werner
*Assistant Examiner*—Eueng-Nan Yeh
(74) *Attorney, Agent, or Firm*—Kenneth L. Sherman; Michael Zarrabian; Myers Dawes Andras & Sherman, LLP

(57) ABSTRACT

A method and apparatus for video sample interpolation with edge sharpening, whereby edge sharpness can be essentially preserved and/or enhanced in the interpolated image. Image interpolation for an original two dimensional image is conducted along the horizontal and vertical directions separately using a 1D digital filter. In interpolating a new sample in the image, the digital filter is first used to obtain a temporary interpolation value for the new sample. Then, an appropriate amount of edge enhancement is calculated for the new sample location. The enhancement value is combined with the temporary interpolation value to result in a final interpolation value for the new sample.

38 Claims, 4 Drawing Sheets

METHOD AND APPARATUS FOR VIDEO IMAGE INTERPOLATION WITH EDGE SHARPENING

FIELD OF THE INVENTION

The present invention relates to image interpolation, and in particular to video image interpolation with edge sharpening.

BACKGROUND OF THE INVENTION

Image interpolation is widely used in applications such as video de-interlacing, video scaling, etc. in digital TV systems. An effective image interpolation technique is important for the overall image quality in a digital TV system. Conventionally, interpolation processes are performed such that a new sample is generated based on the values of original image samples that are neighboring to the new sample position as well as the relative locations of the original image samples to the new sample. Take one dimensional interpolation as an example, if q represents the interpolated sample, and $p_0$ and $p_1$ represent the two closest neighboring pixels of q, then the interpolation value q may be conventionally calculated as $q = d_0 * p_1 + d_1 * p_0$, wherein the distances to q from pixel $p_0$ and $p_1$ are expressed as $d_0$ and $d_1$, respectively. Here, the distance between two original neighboring pixels is assumed to be one, i.e. $d_0 + d_1 = 1$.

However, the conventional interpolation method described above has the undesirable effect of smoothing edges present in the original image. For example, assuming that originally there is a sharp luminance transition between the locations of pixels $p_0$ and $p_1$ in the original image, then using the above interpolation method the transition becomes smoother in the interpolated image as new samples are interpolated between the locations of $p_0$ and $p_1$.

Using FIR (Finite Impulse Response) digital filters, more neighboring pixels can be utilized in interpolating a new sample. Though experiments show that edge sharpness can be improved when more neighboring pixels are utilized in interpolation, generally edges in the interpolated output image still tend to be smoother than those in the original input image.

There is, therefore, a need for a method and apparatus for video image interpolation with edge sharpening and enhancement during the image interpolation process such that edge sharpness can be substantially preserved and/or enhanced in the interpolated image.

BRIEF SUMMARY OF THE INVENTION

The present invention addresses the above problems. In one embodiment, the present invention provides a method and apparatus for video sample interpolation with edge sharpening, whereby edge sharpness can be essentially preserved and/or enhanced in the interpolated image. Accordingly, in one example implementation, image interpolation is conducted along the horizontal and vertical directions separately using a 1D digital filter. In interpolating a new sample in the image (e.g., a new pixel between the two existing neighboring pixels), the digital filter is first used to obtain a temporary interpolation value for the new sample. Then, an appropriate amount of edge enhancement is calculated for the new sample location. The enhancement value is combined with the temporary interpolation value to result in a final interpolation value for the new sample.

The determination of the enhancement value for a new interpolation pixel position is based on the image high frequency components extracted at each of the two existing (i.e., original) pixel locations that are closest to the interpolation position. To obtain the enhancement value, a weighting coefficient is calculated respectively for each of the two high frequency components. The high frequency components are then summed together according to the corresponding weighting coefficients. The result is used as the enhancement value for the new sample location.

In one example according to the present invention, the weighting coefficients are derived via two fourth-order functions and the relative location of the new pixel between the two original neighboring pixels. In another example, the weighting coefficient for each of the two high frequency components is determined solely based on the relative location of the new pixel between the two original neighboring pixels. Yet, in another example, the weighting coefficients are derived via a sinusoidal function and the relative location of the new pixel between the two original neighboring pixels.

Using an enhancement method according to the present invention, edge sharpness in interpolated images is improved. Further, because edge sharpening is performed during the interpolation process based on original image pixels, the computation cost of image interpolation according to the present invention is lower than that of conventional image interpolation followed by image edge enhancement processing.

Other objects, features and advantages of the present invention will be apparent from the following specification taken in conjunction with the following drawings.

DETAILED DESCRIPTION OF THE INVENTION

In one embodiment the present invention provides a method and apparatus for video sample interpolation with edge sharpening, whereby edge sharpness can be essentially preserved and/or enhanced in the interpolated image.

Figure 1:
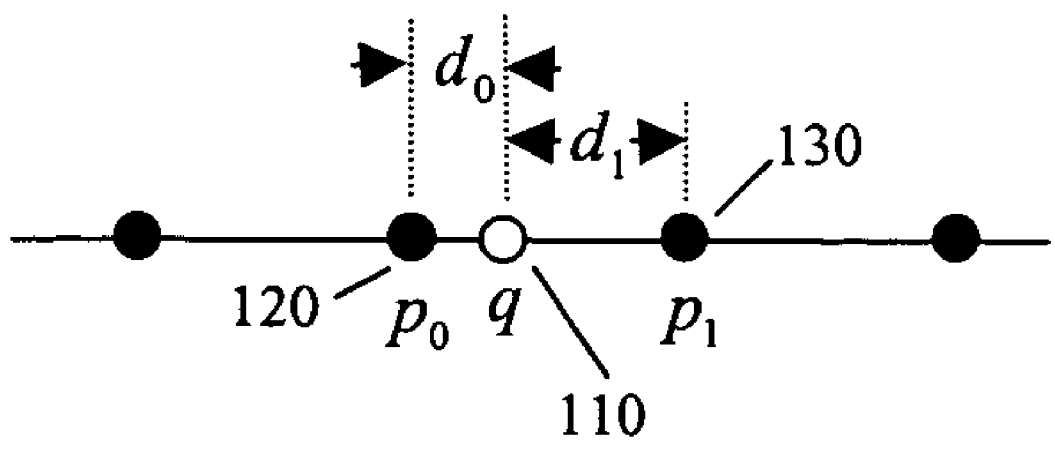
FIG. 1 shows an example of image interpolation wherein a new sample is interpolated based on the two original pixels that are closest to the interpolation position.
Figure 1:

In a conventional interpolation process, a new sample is generated based on the values of original image samples that are neighboring to the new sample position as well as the relative locations of those original image samples to the new sample. FIG. 1 shows an example set of pixels 100 in which a new sample is interpolated based on its two closest neighboring original pixels. In FIG. 1, a hollow circle 110 represents the position where the new sample q is to be interpolated. The solid circles 120, 130 represent original pixel positions $p_0$ and $p_1$ as two closest neighboring original pixels of q. In the following description, $p_0$, $p_1$ and q, etc. are used to refer both the sample location and the sample value. The distances to q from pixels $p_0$ and $p_1$ are expressed as $d_0$ and $d_1$ respectively. Assuming that the distance between two neighboring original pixel locations is one (i.e., $d_0+d_1=1$), then as noted, based on the values of $p_0$ and $p_1$, the interpolation value q can be calculated as:

$$q=d_0*p_1+d_1*p_0 \qquad (1)$$

For two-dimensional image interpolation, the process can be performed along horizontal direction and vertical direction respectively. However, the conventional method of relation (1) tends to smooth edges of the original image. For the example in FIG. 1, assuming that originally there is a sharp luminance transition between the locations of pixel $p_0$ and $p_1$, then the transition becomes smoother with new samples interpolated between the location of $p_0$ and $p_1$.

Conventionally with digital filters, more neighboring pixels may be utilized in interpolating a new sample. As shown by example in FIG. 2, to interpolate a new sample q in a set of pixels 200 on a line n of an image, not only pixels $p_0$ and $p_1$, but also other neighboring pixels, such as $p_{-2}$, $p_{-1}$, $p_2$ and $p_3$, etc, can be used if the digital filter has a length of at least six tap. Applying a digital filter to these neighboring pixels, the output of the filter provides the interpolation value for the new sample q. However, though edge sharpness can be improved when more neighboring pixels are utilized in interpolation, generally edges in the interpolated image still tend to be smoother than that in the original image.

Accordingly, in one embodiment of image interpolation according to the present invention, image interpolation is conducted along the horizontal and vertical directions separately using a 1D digital interpolation filter. In interpolating a new sample in the image (e.g., a new pixel between the two existing neighboring pixels), the digital filter is first used to obtain a temporary interpolation value for the new sample. Then, an appropriate amount of edge enhancement is calculated for the new sample location. The enhancement value is combined with the temporary interpolation value to result in a final interpolation value for the new sample.

The determination of the enhancement value for a new interpolation pixel position is based on the image high frequency components extracted at each of the two existing (i.e., original) pixel locations that are closest to the interpolation position. To obtain the enhancement value, a weighting coefficient is calculated respectively for each of the two high frequency components. The high frequency components are then summed together according to the corresponding weighting coefficients. The result is used as the enhancement value for the new sample location.

In one example according to the present invention, the weighting coefficients are derived via two fourth-order functions and the relative location of the new pixel between the two original neighboring pixels. In another example, the weighting coefficient for each of the two high frequency components is determined solely based on the relative location of the new pixel between the two original neighboring pixels. Yet, in another example, the weighting coefficients are derived via a sinusoidal function and the relative location of the new pixel between the two original neighboring pixels.

Figure 3:
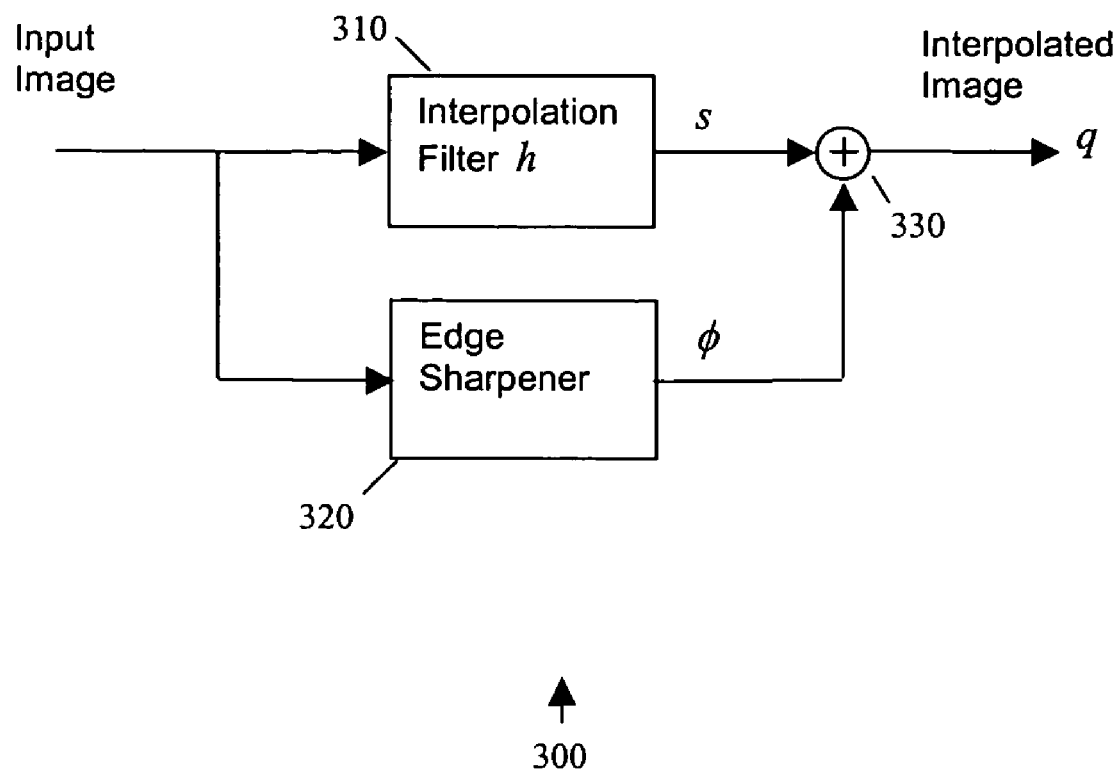
FIG. 3 shows an example functional block diagram of an image interpolator according to an embodiment of the present invention.

FIG. 3 shows an example functional block diagram of a video image interpolator 300 that implements an interpolation method according to the present invention. The interpolator 300 comprises an image interpolation filter 310 and an edge sharpener 320. In one example, the input to the interpolator 300 comprises one dimensional data from either a column or a row of an original image of pixels and the output from the interpolator is an interpolated image.

In FIG. 3, s represents a temporary interpolation value for the current interpolation location, and is calculated based on the interpolation filter h and neighboring pixel values $p_i$. The edge sharpener 320 generates the enhancement value (i.e., enhancement term) $\phi$, which is combined with (e.g., added to) the output s from the image interpolation filter 310 using a combiner 330. The combined value is used as the final interpolation value for a new sample q.

The interpolation filter 310 can, for example, comprise an FIR polyphase filter. As those skilled in the art will recognize other interpolation filters can also be used.

A polyphase filter comprises a group of sub-filters, wherein each sub-filter is used for a different phase of interpolation. Assuming filter h is a N tap, M phase polyphase filter, then the filter has a length of L=N*M and it can be sub-divided into M sub-filters. For example, the sub-filters of the filter h are denoted as $h^j$, j=0,1, ... M−1, wherein j is the interpolation phase. The filter length of each sub-filter $h^j$ is N.

The value of N can be either an odd or even integer. When N is an even number, sub-filter coefficients can be denoted as $h_i^j$, where $$i = -\frac{N}{2}+1, \ldots, 0, \ldots, \frac{N}{2}.$$

When N is an odd number, sub-filter coefficients can be denoted as $h_i^j$, wherein $$i = -\frac{N-1}{2}, \ldots, 0, \ldots, \frac{N-1}{2}.$$

For simplicity of explanation in the example described herein, the value of N is assumed to be an even number.

For image interpolation with a fixed and integer ratio, the value of M can be simply set equal to the interpolation ratio. However, for an image interpolation application that requires arbitrary or variable interpolation ratios, M should be designed large enough to provide a proper interpolation resolution. The number of phases of a polyphase filter determines the number of essentially different interpolation values that can be generated between two neighboring original image pixels. With a phase value of M, a polyphase filter can interpolate M−1 essentially different interpolation values between each two neighboring original image pixels. Therefore, with a larger value of M, the filter can provide better interpolation resolution. In one example, a phase value larger than 10 is used for digital TV related applications. With a good interpolation resolution, a given interpolation position can be approximated by an interpolation phase that is closest to it.

Figure 2:
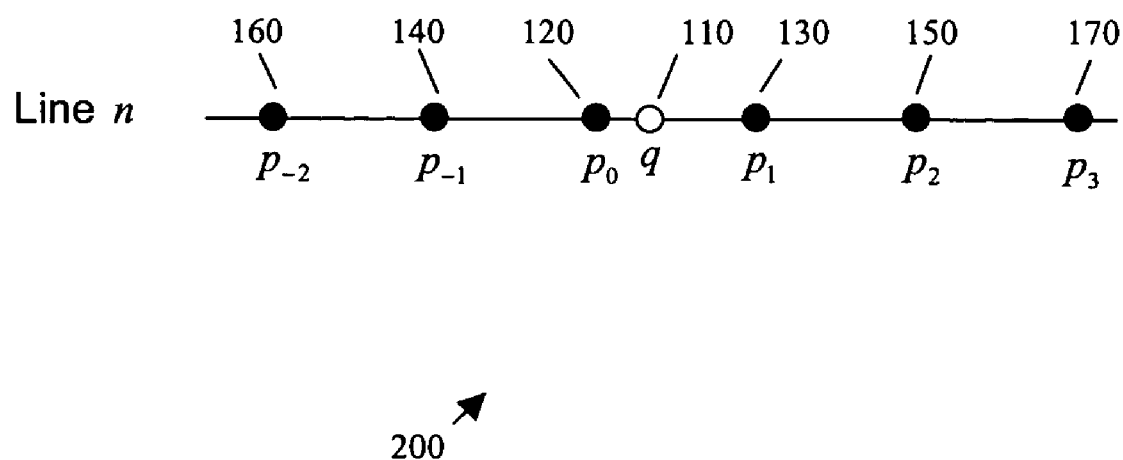
FIG. 2 shows an example of image interpolation wherein a new sample is interpolated based on more than two original neighboring pixels.

If the length of the sub-filters is N (N is assumed to be an even number), for a given interpolation position, the original pixels within the filtering range of interpolation can be denoted as $$p_i, i = -\frac{N}{2}+1, \ldots, 0, \ldots, \frac{N}{2}$$

as shown in FIG. 2, wherein the new pixel q is located between pixel $p_0$ and $p_1$.

Assuming the interpolation phase for the given position q is j, (0≦j<M), the temporary interpolation value s for the position q can be expressed according to relation below:

$$s = \sum_{i=-\frac{N}{2}+1}^{\frac{N}{2}} (h_{-i+1}^j * p_i) \qquad (1a)$$

In relation (1a), filter coefficients of $h^j$ are assumed to be normalized (i.e., the sum of filter coefficients of $h^j$ is equal to 1).

The example edge sharpener 320 in FIG. 3 determines an enhancement value for each new sample location. Assuming the enhancement value is $\phi$, in one example the final interpolation value q for the given new sample location can be expressed as:

$$q = s + \phi \qquad (2)$$

In relation (2), without the enhancement value $\phi$, the value of q would be equal to the interpolation filter output s, which is the image interpolation result based on digital filters. As explained above, the interpolation filter output s typically shows edge sharpness degradation due to interpolation. According to the embodiment of the present invention shown in FIG. 3, an appropriate enhancement value $\phi$ is combined with the interpolation filter output s so that edge sharpness can be essentially preserved and/or enhanced in the final interpolated result q.

To calculate the enhancement value $\phi$ in the edge sharpener 320, image high frequency components are first extracted at the original pixel locations that neighbor the new sample location. As shown in FIG. 2, the hollow circle 110 represents the location where a new sample is to be interpolated and the solid circles 120, 130, 140, 150, 160, 170, etc., represent the original image pixels. In this example, for the new sample q, the two closest original pixels are $p_0$ and $p_1$ (as those skilled in the art will recognize, more than two neighboring sample can be used in the calculations). For pixel $p_0$, an image high frequency component, $\phi_0$, can be calculated in the edge sharpener 320 (FIG. 3) according to the following relation:

$$\phi_0 = p_0 - (p_{-1} + p_1)*/2 \qquad (3)$$

Similarly, an image high frequency component, $\phi_1$, can also be calculated at the location of pixel $p_1$ according to the following relation:

$$\phi_1 = p_1 - (p_0 + p_2)/2 \qquad (4)$$

The operations shown in relations (3) and (4) are essentially high pass filtering operations with a 3-tap FIR filter of $\{-\frac{1}{2}, 1, -\frac{1}{2}\}$. As those skilled in the art will recognize other methods of determining the high frequency components are possible and contemplated by the present invention.

Once the high frequency components $\phi_0$ and $\phi_1$ are determined, two weighting coefficients, $w_0$ and $w_1$, are further calculated. Then, the enhancement value $\phi$ for the new sample location is calculated according to the following relation:

$$\phi = w_0 * \phi_0 + w_1 * \phi_1 \qquad (5)$$

The weighting coefficients $w_0$ and $w_1$ can be determined in different ways. In one case, the values of $w_0$ and $w_1$ are based on the relative location of the new pixel between the two original neighboring pixels. For the example in FIGS. 1 and 2, the values $w_0$ and $w_1$ are both a function of $d_0$ or $d_1$ (e.g., $d_0 + d_1 = 1$). As such, the values $w_0$ and $w_1$ can be expressed according to the following relations:

$$w_0 = f_0(d_0) \qquad (6)$$

$$w_1 = f_1(d_0) \qquad (7)$$

wherein $f_0$ and $f_1$ are functions used for weighting coefficient calculation. They can be either nonlinear functions or linear functions.

In a first example implementation according to the present invention, the functions $f_0$ and $f_1$ are defined as nonlinear functions according to the following relations:

$$f_0(x) = x*(1-x)^\alpha \qquad (8)$$

$$f_1(x) = x^\alpha * (1-x) \qquad (9)$$

wherein $\alpha$ is a positive constant ($\alpha \geq 1$). The inventors discovered that when for example $\alpha$ is equal to the values 3 or 4, most images can be interpolated with appropriate sharpness enhancement. As those skilled in the art will recognize other values for $\alpha$ can also be utilized to obtain desired results.

In another example according to the present invention, the functions $f_0$ and $f_1$ are defined as linear functions according to the following relations:

$$f_0(x) = 1 - x \qquad (10)$$

$$f_1(x) = x \qquad (11)$$

The two linear relations (10) and (11) are much simpler than the nonlinear relations (8) and (9). In addition, the inventors have discovered that the enhancement provided based on relations (10) and (11) looks more natural.

In yet another example according to the present invention, the functions $f_0$ and $f_1$ are defined as sinusoidal functions based on the following relations:

$$f_0(x) = (1 + \cos(x*\pi))/2 \qquad (12)$$

$$f_1(x) = (1 - \cos(x*\pi))/2 \qquad (13)$$

Accordingly, the values $w_0$ and $w_1$ can be calculated using different methods (e.g., relations (8) through (13), etc.).

As such, for each new interpolation position, a new pair of $w_0$ and $w_1$ values is calculated. The edge enhancement value $\phi$ for the position is then calculated according to relation (5) and the interpolation value for the new sample can be determined according to relation (2).

Figure 4:
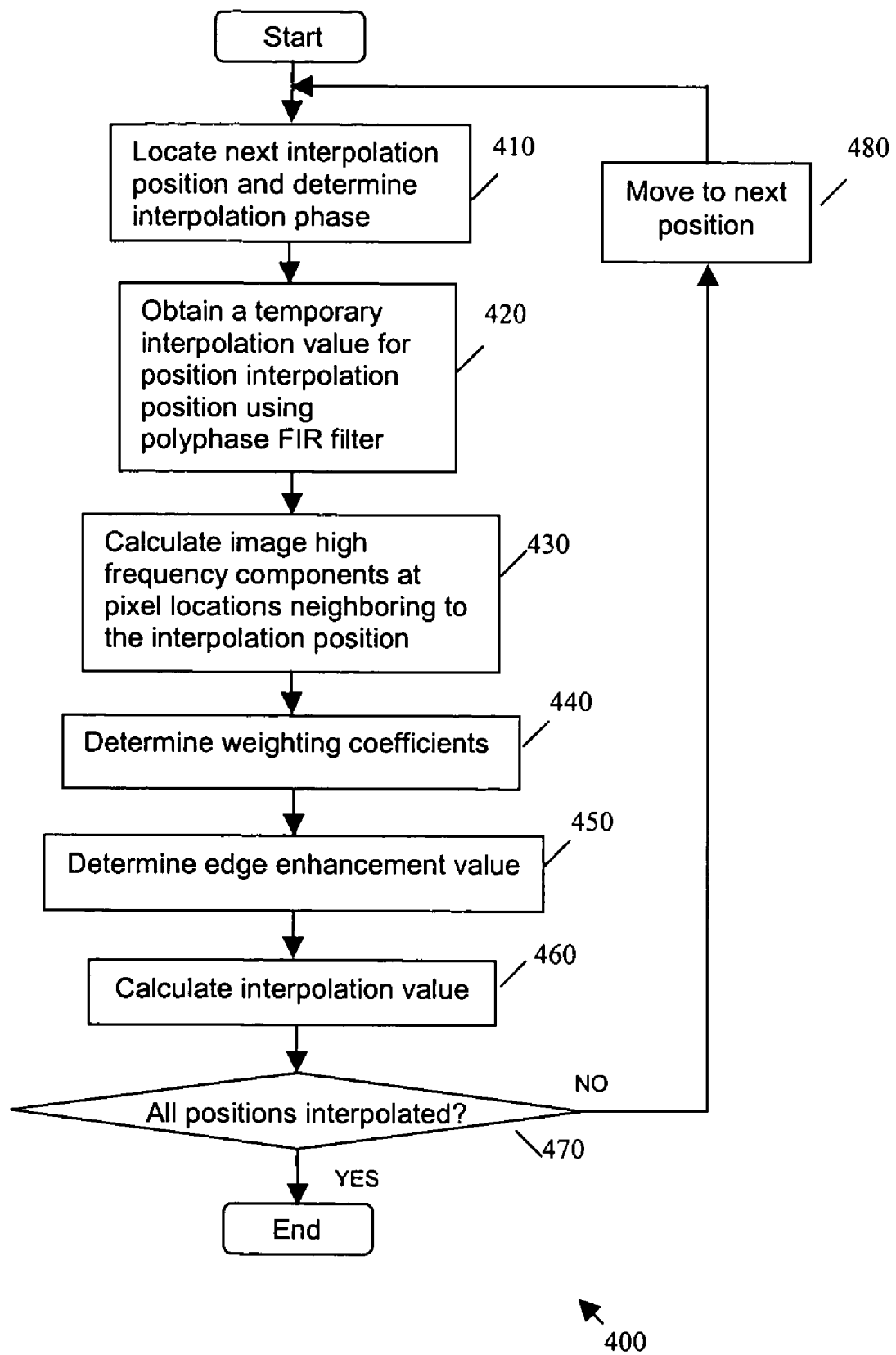
FIG. 4 shows a flowchart of an example image interpolation method according to the present invention.

The flowchart 400 in FIG. 4 shows example steps of an interpolation process with edge enhancement for interpolating an image of pixels according to an embodiment of the present invention. The example interpolation process includes the steps of:

1—Locating next interpolation position q and determining the interpolation phase (step 410).

2—Obtaining a temporary (i.e., intermediate) interpolation value s for position q using a polyphase FIR filter (step 420).

3—Calculating image high frequency components $\phi_0$ and $\phi_1$ at the two original pixel locations that are neighboring to the interpolation position (step 430).

4—Determining weighting coefficients $w_0$ and $w_1$ (step 440).

5—Determining edge enhancement value $\phi$ based on the weighting coefficients (e.g., $\phi = w_0 * \phi_0 + w_1 * \phi_1$) (step 450).

6—Calculating the interpolation value q based on the temporary interpolation value s and the enhancement value $\phi$ (e.g., $q = s + \phi$) (step 460).

7—Determining if all positions have been interpolated (step 470).

8—If not, then moving to the next position (step 480), otherwise terminating the process.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated. The aforementioned example interpolator 300 in FIG. 3, according to the present invention, can be implemented in many ways, such as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of interpolating image positions in an input image to produce an interpolated output image, wherein the input image is represented by digital input pixel data, the method comprising the steps of:
   using a processor to perform the steps comprising:
   (a) interpolating a selected image position in the input image using an interpolation filter to generate a temporary output value for an interpolation position;
   (b) determining an edge enhancement value for the interpolation position based on a sharpness of image transition adjacent the interpolation position; and
   (c) combining the temporary output value and the edge enhancement value to obtain an interpolated output at the interpolation position, such that edge sharpness in the input image is substantially preserved and/or enhanced in the interpolated output image.

2. The method of claim 1 wherein the interpolation filter comprises a polyphase filter.

3. The method of claim 1 wherein in step (b) said edge enhancement value is determined based on high frequency components of the input image extracted at set of pixels at positions neighboring the interpolation position.

4. The method of claim 3 wherein each image high frequency component at a given pixel position is extracted using an finite impulse response (FIR) high-pass filter.

5. The method of claim 4 wherein the FIR high-pass filter comprises a 3-tap FIR filter with coefficients of $\{-\frac{1}{2}, 1, -\frac{1}{2}\}$.

6. The method of claim 3 wherein step (b) further comprises the steps of determining a weighting coefficient for each of said pixel positions such that the edge enhancement term is determined as a weighted combination of said high frequency components using the weighting coefficients.

7. The method of claim 6 wherein the edge enhancement value, $\phi$, is determined as:

$$\phi = w_0 * \phi_0 + w_1 * \phi_1,$$

where $w_0$ and $w_1$ are said weighting coefficients, and $\phi_0$ and $\phi_1$ are said high frequency components determined at each of the pixel positions neighboring the interpolation position.

8. The method of claim 7 wherein:
   the values of the weighting coefficients $w_0$ and $w_1$ are based on the relative location of a new pixel q at the interpolation position proximate said pixel positions, $p_0$ and $p_1$, neighboring the pixel q;
   such that the weighting coefficients $w_0$ and $w_1$ are determined as:

$$w_0 = f_0(d_0),$$

$$w_1 = f_1(d_0) = f_1(1-d_1),$$

wherein $f_0$ and $f_1$ comprise weighting coefficient calculation functions, and $d_0$ and $d_1$ are the distances to the new pixel q at interpolation position from said pixels $p_0$ and $p_1$, respectively, such that $d_0 + d_1 = 1$.

9. The method of claim 8 wherein the functions $f_0$ and $f_1$ are linear functions.

10. The method of claim 8 wherein the functions $f_0$ and $f_1$ are non-linear functions.

11. The method of claim 8 wherein the functions $f_0$ and $f_1$ are non-linear functions of a variable x, and are defined as:

$$f_0(x) = x * (1-x)^\alpha,$$

$$f_1(x) = x^\alpha * (1-x),$$

wherein $\alpha \geq 1$.

12. The method of claim 8 wherein the functions $f_0$ and $f_1$ are linear functions of a variable x, and are defined as:

$$f_0(x) = 1 - x,$$

$$f_1(x) = x.$$

13. The method of claim 8 wherein the functions $f_0$ and $f_1$ are sinusoidal functions of a variable x, and are defined as:

$$f_0(x) = (1 + \cos(x * \pi))/2,$$

$$f_1(x) = (1 - \cos(x * \pi))/2.$$

14. The method of claim 1 wherein the interpolation filter comprises a finite impulse response (FIR) filter.

15. The method of claim 1 wherein the interpolation filter comprises a one dimensional (1D) polyphase finite impulse response (FIR) filter.

16. An interpolator that interpolates image positions in an input image to produce an interpolated output image, wherein the input image is represented by digital input pixel data, comprising:
   logic circuits comprising:
   (a) an interpolation filter that interpolates in the input image to generate an temporary output value for an interpolation position;
   (b) an edge sharpener that determines an edge enhancement value for the interpolation position based on a sharpness of image transition adjacent the position; and
   (c) a combiner that combines the temporary output value and the enhancement value to obtain an interpolated output at the interpolation position, such that edge sharpness in the input image is substantially preserved and/or enhanced in the interpolated image.

17. The interpolator of claim 16 wherein the interpolation filter comprises a polyphase filter.

18. The interpolator of claim 16 wherein the edge sharpener determines said edge enhancement value based on high frequency components of the input image extracted at set of pixels at positions neighboring the interpolation position.

19. The interpolator of claim 18 further comprising an finite impulse response (FIR) high-pass filter such that each image high frequency component at a given pixel position is extracted using the FIR high-pass filter.

20. The interpolator of claim 19 wherein the FIR high-pass filter comprises a 3-tap FIR filter with coefficients of $\{-\frac{1}{2}, 1, -\frac{1}{2}\}$.

21. The interpolator of claim 18 wherein the edge sharpener further determines a weighting coefficient for each of said pixel positions and determines the edge enhancement term as a weighted combination of said high frequency components using the weighting coefficients.

22. The interpolator of claim 21 wherein the edge enhancement value, $\phi$, is determined as:

$$\phi = w_0 * \phi_0 + w_1 * \phi_1,$$

where $w_0$ and $w_1$ are said weighting coefficients, and $\phi_0$ and $\phi_1$ are said high frequency components determined at each of the pixel positions neighboring the interpolation position.

23. The interpolator of claim 22 wherein:
the values of the weighting coefficients $w_0$ and $w_1$ are based on the relative location of a new pixel q at the interpolation position proximate said pixel positions, $p_0$ and $p_1$, neighboring the pixel q;
such that the weighting coefficients $w_0$ and $w_1$ are determined as:

$$w_0 = f_0(d_0)$$

$$w_1 = f_1(d_0) = f_1(1-d_1),$$

wherein $f_0$ and $f_1$ comprise weighting coefficient calculation functions, and $d_0$ and $d_1$ are the distances to the new pixel q at interpolation position from said pixels $p_0$ and $p_1$, respectively, such that $d_0 + d_1 = 1$.

24. The interpolator of claim 23 wherein the functions $f_0$ and $f_1$ are linear functions.

25. The interpolator of claim 23 wherein the functions $f_0$ and $f_1$ are non-linear functions.

26. The interpolator of claim 23 wherein the functions $f_0$ and $f_1$ are non-linear functions of a variable x, and are defined as:

$$f_0(x) = x * (1-x)^\alpha,$$

$$f_1(x) = x^\alpha * (1-x),$$

wherein $\alpha \geq 1$.

27. The interpolator of claim 23 wherein the functions $f_0$ and $f_1$ are linear functions of a variable x, and are defined as:

$$f_0(x) = 1-x,$$

$$f_1(x) = x.$$

28. The interpolator of claim 23 wherein the functions $f_0$ and $f_1$ are sinusoidal functions of a variable x, and are defined as:

$$f_0(x) = (1+\cos(x*\pi))/2,$$

$$f_1(x) = (1-\cos(x*\pi))/2.$$

29. The interpolator of claim 16 wherein the interpolation filter comprises a finite impulse response (FIR) filter.

30. The interpolator of claim 16 wherein the interpolation filter comprises a one dimensional (1D) polyphase FIR filter.

31. A method of interpolating image positions in an input image to produce an interpolated output image, wherein the input image is represented by digital input pixel data, comprising the steps of:
using a processor to perform the steps comprising:
(a) interpolating in the input image by using a polyphase finite impulse response (FIR) interpolation filter to generate a temporary output value for an interpolation position;
(b) determining an edge enhancement value for the interpolation position based on a sharpness of image transition adjacent the interpolation position, including the steps of:
determining said edge enhancement value as a function of high frequency components of the input image extracted at pixel positions neighboring the interpolation positions;
determining a weighting coefficient for each of said neighboring pixel positions; and
determining the edge enhancement term as a weighted combination of said high frequency components using the weighting coefficients; and
(c) combining the temporary output value and the enhancement value to obtain an interpolated output at the interpolation position, such that edge sharpness in the input image is substantially preserved and/or enhanced in the interpolated image.

32. The method of claim 31 wherein:
the neighboring pixels comprise at least two pixels $p_0$ and $p_1$ closest to a new pixel q at the interpolation position, and
the edge enhancement value, $\phi$, is determined as:

$$\phi = w_0 * \phi_0 + w_1 * \phi_1,$$

where $w_0$ and $w_1$ are said weighting coefficients for said pixels $p_0$ and $p_1$, respectively, and $\phi_0$ and $\phi_1$ are said high frequency components determined for said pixels $p_0$ and $p_1$, respectively.

33. The method of claim 32 wherein:
the values of the weighting coefficients $w_0$ and $w_1$ are based on the relative location of the new pixel q at the interpolation position proximate said pixel positions, $p_0$ and $p_1$, neighboring the pixel q;
such that the weighting coefficients $w_0$ and $w_1$ are determined as:

$$w_0 = f_0(d_0),$$

$$w_1 = f_1(d_0) = f_1(1-d_1),$$

wherein $f_0$ and $f_1$ comprise weighting coefficient calculation functions, and $d_0$ and $d_1$ are the distances to the new pixel q at interpolation position from said pixels $p_0$ and $p_1$, respectively, such that $d_0 + d_1 = 1$.

34. The method of claim 33 wherein the functions $f_0$ and $f_1$ are linear functions.

35. The method of claim 33 wherein the functions $f_0$ and $f_1$ are non-linear functions.

36. The method of claim 33 wherein the functions $f_0$ and $f_1$ are non-linear functions of a variable x, and are defined as:

$$f_0(x) = x * (1-x)^\alpha,$$

$$f_1(x) = x^\alpha * (1-x)$$

wherein $\alpha \geq 1$.

37. The method of claim 33 wherein the functions $f_0$ and $f_1$ are linear functions of a variable x, and are defined as:

$$f_0(x) = 1-x,$$

$$f_1(x) = x.$$

38. The method of claim 33 wherein the functions $f_0$ and $f_1$ are sinusoidal functions of a variable x, and are defined as:

$$f_0(x) = (1+\cos(x*\pi))/2$$

$$f_1(x) = (1-\cos(x*\pi))/2.$$

* * * * *